(12) United States Patent
Mirtchi et al.

(10) Patent No.: US 6,475,358 B2
(45) Date of Patent: Nov. 5, 2002

(54) METHOD FOR PROVIDING A PROTECTIVE COATING FOR CARBONACEOUS COMPONENTS OF AN ELECTROLYSIS CELL

(75) Inventors: Amir A. Mirtchi, Jonquière (CA); Jules Bergeron, Jonquière (CA)

(73) Assignee: Alcan International Limited, Montreal (CA)

( * ) Notice: Subject to any disclaimer, the term of this patent is extended or adjusted under 35 U.S.C. 154(b) by 86 days.

(21) Appl. No.: 09/777,589

(22) Filed: Feb. 6, 2001

(65) Prior Publication Data

US 2001/0035347 A1 Nov. 1, 2001

Related U.S. Application Data

(60) Provisional application No. 60/183,062, filed on Feb. 16, 2000.

(51) Int. Cl.$^7$ .............................................. B01D 59/50
(52) U.S. Cl. ................... 204/247.3; 204/247.4; 204/294; 204/290.1; 204/290.11; 204/290.12; 204/290.15; 205/380; 205/384; 205/385; 427/113; 427/126.1; 252/387
(58) Field of Search .................. 204/290.1, 290.11, 204/290.12, 247.3, 247.4, 243.1, 294; 205/380, 384, 385; 427/113, 126.1; 252/387

(56) References Cited

U.S. PATENT DOCUMENTS

| 3,852,107 A | | 12/1974 | Lorkin et al. |
| 4,192,730 A | * | 3/1980 | Dumas et al. ............... 204/294 |
| 4,624,766 A | | 11/1986 | Boxall et al. |
| 5,486,278 A | | 1/1996 | Manganiello et al. |

FOREIGN PATENT DOCUMENTS

| EP | WO 98/17842 | 4/1998 |
| WO | 83 00325 | 2/1983 |

OTHER PUBLICATIONS

Database WPI, Sec. Ch, Week 199110, Derwent, AN 1991–071487. XP002171604, abstract of SU 1 556 809A, 4/90, Soviet Union.
Database Chemabs, Chem. Abstr. Svc., AN 133:8237 CA, XP002171603, abstract of RO 112844 B, 1/98, Romania.

* cited by examiner

*Primary Examiner*—Bruce F. Bell
(74) *Attorney, Agent, or Firm*—Cooper & Dunham LLP

(57) ABSTRACT

A method of treating a carbonaceous cell component of an electrolyte cell for the production of aluminum, to impart protection against deterioration during operation of the cell. A liquid suspension of a refractory material dispersed in a lignosulfonate binder solution is prepared and applied as a protective coating to the surface of carbonaceous cell components and allowed to dry.

34 Claims, 1 Drawing Sheet

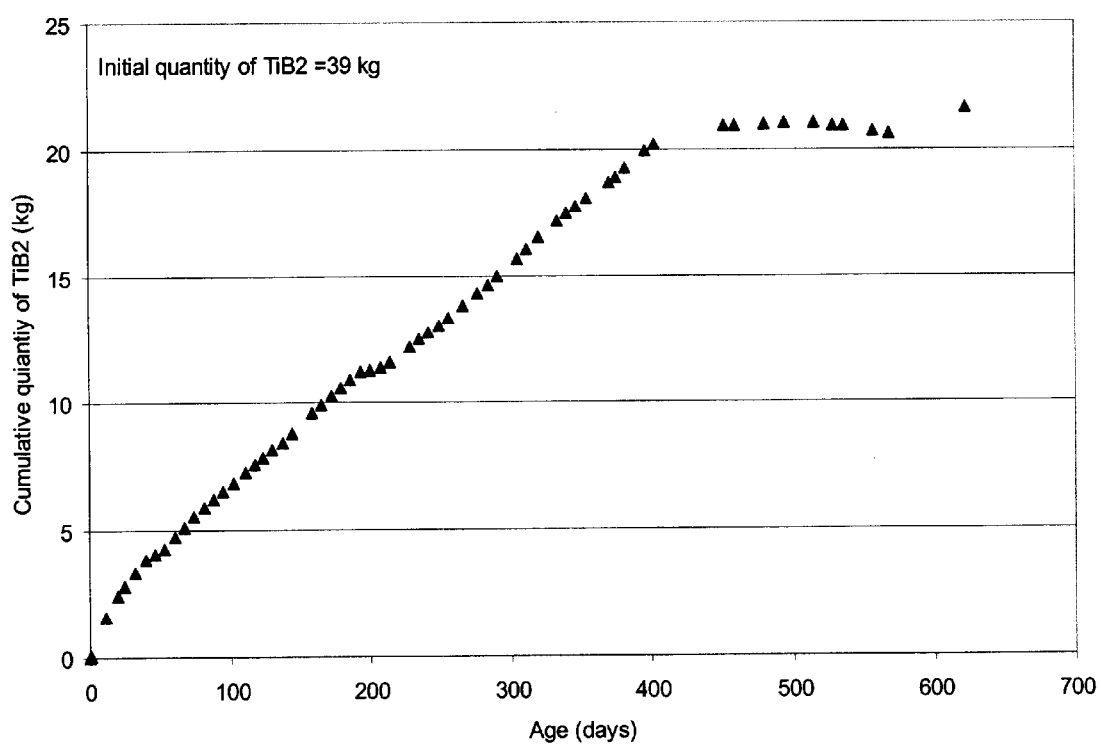
Figure 1: Cumulative quantity of TiB$_2$ removed from industrial cells during operation.

METHOD FOR PROVIDING A PROTECTIVE COATING FOR CARBONACEOUS COMPONENTS OF AN ELECTROLYSIS CELL

CROSS REFERENCE TO RELATED APPLICATION

This application claims the priority benefit under 35 U.S.C. §119(e) of U.S. provisional application No. 60/183,062, filed Feb. 16, 2000.

BACKGROUND OF THE INVENTION

1. Field of Invention

This invention relates to the production of protective coatings for carbonaceous components of electrolytic cells used in the production of aluminum. The invention more specifically relates to coating compositions which provide carbonaceous components of electrolytic cells with protection from deterioration during electrolysis and components containing the same.

2. Description of Related Art

The manufacture of aluminum is conducted conventionally by the Hall-Heroult electrolytic reduction process, whereby alumina is dissolved in molten cryolite and electrolyzed at temperatures of about 900 to 1000° C. This process is conducted in a reduction cell typically comprising a steel shell provided with an insulating lining of suitable refractory material, which is in turn provided with a lining of carbon which contacts the molten constituents. One or more anodes, typically made of prebaked carbon blocks, are connected to the positive pole of a direct current source, and suspended within the cell. One or more conductor bars connected to the negative pole of the direct current source are embedded in the carbon cathode substrate comprising the floor of the cell, thus causing the cathode substrate to become cathodic upon application of current.

Prebaked anodes used in the production of aluminum are comprised of an aggregate of petroleum coke with pitch as a binder, while the carbon lining is typically constructed from an array of prebaked cathode blocks, rammed together with a mixture typically comprising of anthracite, tar, and coal tar pitch.

Aluminum is produced in a molten form within an electrolysis cell as a result of the following reaction:

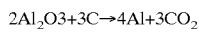

$$2Al_2O_3 + 3C \rightarrow 4Al + 3CO_2$$

In the conventional design of the Hall-Heroult cell, aluminum collects as a pool of molten aluminum along the base of the cell. In doing so, oxygen becomes liberated and reacts with the available carbon on the surface of the anodes to produce carbon dioxide gas. Theoretically, 0.334 kg of anodic carbon is consumed per kilo of aluminum produced as represented by the above reaction. In reality, however, anodic consumption is 25–35% greater.

Excess consumption of the prebaked anodes is the result of a series of secondary reactions, which can be summarized as follows:

i) Air oxidation: oxidizing reactions result from oxygen in the air contacting the upper part of the anode and, if the anode is left unprotected, reacting to produce carbon dioxide;

ii) Boudouard reaction: carbo-oxidation reactions result from $CO_2$ at the surface of the anode being immersed in the electrolyte and producing carbon monoxide (known as the Boudouard equilibrium); and iii) Dusting: the selective oxidation of pitch coke with respect to petroleum coke, results in the release of carbon particles, generating dust, which has negative effects on the operation.

The loss effected by such secondary reactions within the electrolytic cell amounts to approximately 10% of the production cost of aluminum.

The economic inefficiencies of aluminum production can be further attributed to the deterioration of the carbon lining or cathodic material of the electrolytic cell as a result of erosion and penetration of electrolyte and liquid aluminum, as well as intercalation by metallic sodium.

Although the Hall-Heroult process for aluminum production is the most reliable to date, there is a continual need for improvement. In view of the economic impact of the inefficiencies of this process, considerable effort has focused on the development of improved electrolytic cell components which are capable of withstanding the harsh conditions imposed by the electrolysis of aluminum.

For instance, U.S. Pat. No. 3,852,107 to Lorkin et al. teaches of an impermeable protective coating for electrodes comprising a matrix having a melting point under 1000° C. and a refractory filler, dissolved or suspended in a liquid carrier such as water. As an example, the matrix component of this coating was described as a graphite wettable material such as boric acid and/or a glaze forming material such as sodium aluminum fluoride. Suggested refractory fillers include oxides, carbides, nitrides or borides. The use of a suitable surface tension modifying agent such as chrome ore was suggested in certain situations to improve the wetting of the graphite.

U.S. Pat. No. 4,624,766 to Boxall, et al. describes an aluminum wettable, cured, carbonized cathode material for use in aluminum electrolysis cells, comprising a hard refractory material in a carbonaceous matrix which includes a carbonaceous filler and carbon fiber bonded by a non-graphitized amorphous carbon, this matrix having a rate of ablation essentially equal to the rate of wear and dissolution of the refractory hard material in the operating environment of the cell.

Sekhar et al., WO 98/17842 published Apr. 30, 1998, describes a method for applying a refractory boride to components of an aluminum electrolysis cell by forming a slurry of particulate preformed refractory boride in at least two grades of colloidal carriers selected from the group consisting of colloidal alumina, yttria, ceria, thoria, zirconia, magnesia, lithia, monoaluminum phosphate, cerium acetate and mixtures thereof, the two colloidal carriers preferably each being of the same colloid, followed by drying. The two grades of colloidal carrier have mean particle sizes which differ from one another by about 10–50 nanometers.

U.S. Pat. No. 5,486,278 to Manganiello discloses a method of impregnating a carbonaceous cell component with a boron-containing solution to improve resistance to deterioration during cell operation. When water was used as the solvent for the boron-containing solution, a surfactant was required to achieve an acceptable treatment time. Alternatively, the solvent could be chosen from methanol, ethylene glycol, glycerin and mixtures thereof. This method required the intake of the boron-containing solution to a depth of 1–10 cm into the component to be protected. This patent further disclosed that the air oxidation of carbonaceous components treated in this manner was comparable to the net consumption of similar components treated with traditional aluminum protective coatings.

Despite previous efforts, conventional techniques for performing the electrolysis of aluminum are still employed most often. This indicates that a more technically superior or economically profitable method of combating carbonaceous cell component deterioration is not known.

Lignosulfonates, such as ammonium lignosulfonate, have long been used as binders in a variety of different industries but not in aluminum electrolysis cells.

It is an object of the present invention to provide an effective and economical method of treating components of an electrolytic cell, for producing aluminum, to protect them from deterioration during operation of the cell.

BRIEF SUMMARY OF THE INVENTION

The present invention in its broadest aspect relates to a method of treating a carbonaceous cell component of an electrolytic cell for the production of aluminum, to improve the resistance of the component to deterioration during operation of the cell. The method comprises preparing a liquid suspension of refractory material dispersed in a lignosulfonate binder solution and applying the liquid as a protective coating to the carbonaceous cell component, followed by drying the coating. The refractory material may be selected from a wide variety of refractory compounds, such as boron, zirconium, vanadium, hafnium, niobium, tantalum, chromium and molybdenum compounds.

As a by-product of the pulp and paper industry, lignosulfonate is both abundant and relatively inexpensive. It has been found to be surprisingly effective as a binder in the harsh environment of an aluminum electrolysis cell.

According to one embodiment of the invention, lignosulfonate binder is used in the coating of prebaked carbon anodes. For this purpose, a liquid suspension is prepared of a boron compound, e.g. boric acid, boron oxide, hydrated boron oxide or borax, aluminum fluoride and a lignosulfonate binder, e.g. ammonium or calcium lignosulfonate, and the liquid suspension is applied as a protective coating on the anode. Typically, it is applied to the portions of the anode which are exposed to the atmosphere during cell operation. Following application, the coating is dried, e.g. by air drying at room temperature. For greater coating strength, the suspension may also include a phenolic resin binder.

In accordance with a further embodiment of the invention, the lignosulfonate binder is used for coating carbon cathode structures of an aluminum electrolysis cell. For this purpose, a liquid suspension is prepared of a refractory boride, e.g. titanium diboride, a lignosulfonate binder and a phenolic resin binder. This liquid suspension is then applied as a protective coating to the cathode structure, followed by drying.

DETAILED DESCRIPTION OF THE INVENTION

As the formulation base of the liquid suspensions of the present invention, lignosulfonate acts as a dispersant for dispersing the ingredients in the bulk liquid state, a wetting agent for even application of the coating and a binder to create a continuous layer of suspended solids which effectively adheres to the carbonaceous surface.

Oxidation of the upper part of prebaked anodes during cell operation is one of the principal reasons for excess net carbon consumption. In general, prebaked anodes are covered with alumina, crushed bath or a mix thereof to protect them against air oxidation. The practice of applying an aluminum coating to anodic components in Hall-Heroult cell, to reduce the rate of air oxidation is widely used in aluminum production. However, this practice is not optimal with a net carbon consumption of approximately 410–460 kg/t Al. Not to mention, the exorbitant costs associated with aluminum coatings.

One preferred embodiment of the present invention provides a mixture of a boron compound, e.g. boric acid, boron oxide, hydrated boron oxide or borax, and aluminum fluoride dispersed in a lignosulfonate binder as a viscous liquid. In this form, the liquid may be applied to the surface of an anodic surface by pulverization (spraying). Upon drying, a protective coating exists which is capable of combating deterioration of the anode by oxidation. This viscous liquid can be applied to the upper one-half to one-third region of a prebaked anode at ambient temperature with an air gun at 120 psi pressure and allowed to dry at room temperature for approximately 3 hours. The coating is preferably applied over a general thickness range of 0.5 to 2mm. Application of the coating to an approximate thickness of 1 mm is most preferred.

The viscous coating liquid typically contains about 20 to 60% by weight of a 50% lignosulfonate solution, 25 to 60% by weight of boric acid and 0 to 25% by weight of aluminum fluoride. A preferred range is 20 to 40% lignosulfonate (50% solution), 30 to 55% boric acid and 0 to 15% aluminum fluoride. A particularly preferred range is 25–35% lignosulfonate (50% solution), 35–55% boric acid and 0–10% aluminum fluoride. The coating liquid may also contain up to 20% by weight of phenolic resin.

During operation in an aluminum electrolysis cell, the temperature of the top of the anodes in the cell reach approximately 550 to 650° C. When coated with the above viscous coating liquid, and dried, the anodes are protected against oxidation by the formation of a boron and aluminum oxide coating on the anode.

A significant decrease in net carbon consumption is estimated for anodic components, having the protective coating as taught by this invention. It is estimated that the coating composition of this invention provides a savings of approximately $3 per ton of metal produced for each percent decrease in net carbon consumption.

Another preferred embodiment of the invention relates to a process for protecting the exposed surface of cathode blocks in an aluminum electrolysis cell, by applying a coating comprising titanium diboride dispersed in a mixture of lignosulfonate and phenolic resin. Such a coating provides wetting properties and erosion resistance as well as significantly reducing the deterioration of the underlying layers due to sodium and bath penetration. This coating mixture typically contains about 5 to 40% by weight lignosulfonate (50% solution), about 5 to 40% by weight phenolic resin, about 20 to 70% by weight titanium diboride and 0 to 5% anthracite (or graphite). A preferred composition contains about 14 to 20% lignosulfonate (50%), about 14 to 20% by weight phenolic resin and about 50 to 70% by weight titanium diboride and 2% to 5% by weight anthracite (<74 micron). While titanium boride is the preferred material for this purpose, a wide variety of borides may be used, e.g. zirconium, vanadium, hafnium, niobium, tantalum, chromium or molybdenum boride.

This coating mixture is preferably applied to a thickness of about 1–3 mm with a spray gun at 120 psi pressure and the coated cathode is first air dried at room temperature for about 10 hours. Although, it is possible to increase the lifetime of the coating by increasing the thickness to 10–15 mm by applying many layers of the coating. Between each layer, the coating could be dried by a heating system at about 100–150° C. The coated cathode is then preheated as a part of normal cell start-up. In preparation for the preheat, the cathode is covered with a 4 inch layer of coke (no bath) and the anodes are lowered until they rest on the coke layer. A current is then applied and under these conditions the coating will reach a temperature of about 1000° C., in about 25 hours.

The above composition provides a wettable surface for the metal and not only protects the exposed cathode surface from deterioration, but also reduces the absorption of sodium by the cathode lining in general and reduces the oxidation of the side wall blocks, when applied to these areas.

BRIEF DESCRIPTION OF THE DRAWING

FIG. 1 is a plot showing the cumulative quantity of $TiB_2$ removed from an aluminum electrolysis over a period of time.

DETAILED DESCRIPTION OF THE INVENTION

Example 1

A liquid suspension was prepared by mixing 30% wt. $H_3BO_3$, 30% wt. $AlF_3$ and 40% wt. ammonium lignosulfonate. The lignosulfonate was a 50% liquid preparation (NORLIG TSFL™) obtained from Borregaard Lignotech, Bridgewater, N.J. In liquid state, the lignosulfonate has a pH range of 4–5 and comprises 47.5 to 51.5% solids. The $H_3BO_3$, and $AlF_3$ were in the form of powders.

Using a spray gun at 120 psi pressure, the liquid suspension was sprayed onto the top of prebaked anodes to approximately one-half to one-third the height of the anodes.

Example 2

A series of oxidation tests were conducted using small lab scale samples of anode material coated with various coating formulations having lignosulfonate as the principal binder. NORLIG TSFL™ was again used as in Example 1. The coatings were applied to a thickness of about 2 mm using a spray gun at 120 psi pressure and then air dried at room temperature for about 3 hours.

For the oxidation test, the coated samples were exposed to high temperatures in a furnace measuring 13"×7"×10. The furnace was heated from room temperature to 600° C. over a period of 4 hours and held at 600° C. for 12 hours.

Each sample was weighted before and after exposure and the percentage weight loss was calculated. The compositions of the coatings and the results obtained are shown in Table 1, below:

TABLE 1

Oxidation Test Compositions and Results.

| SAMPLE No. | Binders | | Solids | | | OXIDATION |
|---|---|---|---|---|---|---|
| | LSA** (%) | Phenolic Resin | $B_2O_3$ (%) | $H_3BO_3$ (%) | Additive (%) | (% weight loss) |
| Control Test | 0 | | 0 | 0 | 0 | 60–90 |
| E-38 | 40 | | 1 | 56 | 3 SiC | 24 |
| E-39 | 40 | | 1 | 58 | 1 SiC | |
| E-40 | 40 | | 1 | 56 | 3 $AlF_3$ | 38 |
| E-41 | 40 | | 1 | 58 | 1 $AlF_3$ | 29 |

TABLE 1-continued

Oxidation Test Compositions and Results.

| SAMPLE No. | Binders | | Solids | | | OXIDATION |
|---|---|---|---|---|---|---|
| | LSA** (%) | Phenolic Resin | $B_2O_3$ (%) | $H_3BO_3$ (%) | Additive (%) | (% weight loss) |
| E-42* | 40 | | 1 | 56 | 3 $SiO_2$ | 38 |
| E-44 | 40 | | 1 | 56 | 3 SiC | 40 |
| E-45 | 40 | | 1 | 58 | 1 SiC | 22 |
| E-46 | 40 | | 1 | 56 | 3 $AlF_3$ | 25 |
| E-47 | 40 | | 1 | 58 | 1 $AlF_3$ | 29 |
| E-48* | 40 | | 1 | 56 | 3 $SiO_2$ | 15 |
| E-49* | 40 | | 1 | 58 | 1 $SiO_2$ | 18 |

*measurements include weight of coating
**LSA - ammonium lignosulfonate

Example 3

The procedure of Example 2 was repeated using a further variety of coating compositions. The coating compositions used and the oxidation results obtained are shown in Table 2, below:

TABLE 2

Oxidation Test Compositions and Results.

| SAMPLE No. | Binders | | Solids | | | OXIDATION |
|---|---|---|---|---|---|---|
| | LSA** (%) | Phenolic Resin | $B_2O_3$ (%) | $H_3BO_3$ (%) | Additive (%) | (% weight loss) |
| Control Test | 0 | | 0 | 0 | 0 | 60–90 |
| E-60 | 40 | | 1 | 57 | 2 SiC | 7 |
| E-61 | 40 | | 1 | 57 | 2 SiC | 1 |
| E-62* | 40 | | 1 | 57 | 2 $SiO_2$ | 1 |
| E-63* | 40 | | 1 | 57 | 2 $SiO_2$ | 2 |
| E-78 | 40 | | — | 30 | 30 $AlF_3$ | 0 |
| E-79 | 40 | | — | 30 | 30 $AlF_3$ | 0 |
| E-80 | 40 | | 2 | 28 | 30 $AlF_3$ | 0 |
| E-81 | 40 | | 2 | 28 | 30 $AlF_3$ | 0 |
| E-76 | 40 | | — | — | 60 $AlF_3$ | 39 |
| E-77 | 40 | | — | — | 60 $AlF_3$ | 41 |

*measurements include weight of coating
**LSA - ammonium lignosulfonate

Example 4

For these tests, the coatings were prepared and applied in the same manner as in Example 2. Some of the coatings contained a phenolic resin binder (DURITE Phenolic Resin RL-2360B). For the high temperature oxidation tests, the samples were placed on a bed of alumina powder. This duplicates more closely the actual conditions in the plant since alumina powder, which is the raw material fed to the electrolysis cell to produce metallic aluminum, is used to cover the anodes during cell operation.

The coating compositions and the results obtained are shown in Table 3, below:

TABLE 3

Oxidation Test Compositions and Results.

| SAMPLE No. | Binders | | | Solids H$_3$BO$_3$ | | OXIDATION |
|---|---|---|---|---|---|---|
| | LSA** (%) | Phenolic Resin | B$_2$O$_3$ (%) | (%) powder | Additive (%) | (% weight loss) |
| Control Test | 0 | 0 | | 0 | 0 | 60-90 |
| E-98 | 40 | — | | 30 | bn fin 30 | 14 |
| E-100 | 40 | — | | 20 | bn fin 40 | 23 |
| E-106 | 40 | — | | 30 | bn fin 30 | 11 |
| E-105 | 40 | — | | 40 | 20 AlF$_3$ | 4 |
| E-108 | 40 | — | | 40 | 20 AlF$_3$ | 5 |
| O-160 | 38 | 2 | | 30 | 30 AlF$_3$ | 7 |
| O-161 | 35 | 5 | | 30 | 30 AlF$_3$ | 5 |
| O-162 | 35 | 5 | | 40 | 20 AlF$_3$ | 0 |
| O-163 | 38 | 2% CaO | | 30 | 30 AlF$_3$ | 8 |

As a control, each oxidation test included an anode sample without any protective coating according to our invention. These unprotected samples showed a weight loss of 60 to 90% by weight.

Example 5

Further tests were conducted using lab scale samples of anodic material as in Example 2, using the same lignosulfonate and phenolic resin as in Examples 2 and 4. As a source of AlF$_3$, a finely divided solid bath material recovered from pots was used, containing about 50% AlF$_3$ and 50% Al$_3$O$_3$.

The coated samples were subjected to a high temperature oxidation in a furnace as in Example 2 and the results obtained are shown in Table 4. Also a plant test is underway with the composition O-175.

TABLE 4

Oxidation Test Compositions and Results.

| Sample | Lignosulfonate (50%) | Phenolic Resin | H$_3$BO$_3$. | Fine Bath | % Weight Loss |
|---|---|---|---|---|---|
| Control | 0 | 0 | 0 | 0 | 60–90 |
| O-174 | 31 | 18 | 51 | — | 0 |
| O-175 | 29 | 17 | 37 | 17 | 0 |

*granular - 100% active.

Example 6

A series of coating compositions were prepared for application to cathode structures. The same lignosulfonate and phenolic resin were used as in the previous example. The compositions contained by weight 60% titanium diboride, 5% anthracite (<74 micron), 17.5% of phenolic resin and 17.5% of ammonium lignosulfonate solution (50% wt.). Some also contained –200 mesh anthracite. They were prepared as viscous dispersions fluid enough to be applied by spraying.

Using a spray gun at 120 psi pressure the compositions were sprayed onto exposed surfaces of cathodes. The coatings were dried, pre-heated and subjected to electrolysis tests at 900° C. for up to 100 hours. After this test, the total surface of the coated cathode sample was wetted by aluminum and no erosion was observed.

Example 7

Plant tests using 6 full scale electrolysis cells have been completed with the following coating composition: 17.5% phenolic resin, 17.5% ammonium lignosulfonate solution (50%), 60% TiB$_2$ and 5% anthracite (<74 micron). The cathodic surface (bottom blocks, monolithic ramming paste and sidewall block) was covered by about 60 to 70 kg of coating in total for all of the test cells. The thickness of this coating was about 1 mm. The concentration of the Ti and B in the aluminum produced by the 6 test cells was compared with the levels in 6 control cells to determine the coating lifetime during cell operation. Based on these results the lifetime of a coating having a one mm thickness is about 350–400 days. It is know that during cell operation the carbon cathode erosion rate without the coating is about 15 to 30 mm per year. FIG. 1 presents the cumulative quantity of TiB$_2$ remove from the test cells based on the concentration of Ti and B in the aluminum. The plant test demonstrates that the erosion rate of coated cathode blocks is lower than 1 mm/year, which is much lower than the erosion rate for uncoated blocks.

What is claimed is:

1. A method of treating a carbonaceous cell component of an electrolytic cell for the production of aluminum, to improve the resistance of said component to deterioration during operation of the cell, which comprises preparing a liquid suspension of refractory material dispersed in a lignosulfonate binder solution, applying the suspension as a coating to the surface of said carbonaceous cell component and thereafter drying the coating.

2. The method of claim 1 wherein the refractory compound is a boron, zirconium, vanadium, hafnium, niobium, tantalum, chromium or molybdenum compound.

3. The method of claim 2 wherein the liquid suspension also contains a phenolic resin binder.

4. The method of claim 1 wherein the liquid suspension comprises a boron compound, aluminum fluoride and a lignosulfonate binder.

5. The method of claim 4 wherein the boron compound is boric acid, boron oxide or hydrated boron oxide.

6. The method of claim 1 wherein the refractory material is titanium diboride.

7. The method of claim 1 wherein the lignosulfonate binder comprises an ammonium or calcium salt.

8. A method of treating a carbon anode used in aluminum electrolysis cells, to improve the resistance of the anode to deterioration during operation of the cell, which comprises preparing a liquid suspension of a boron compound, aluminum fluoride and a lignosulfonate binder and applying the liquid suspension as a protective coating at least to the portion of the anode which is exposed to the atmosphere during cell operation, followed by drying the coating.

9. The method of claim 8 wherein the suspension contains 25 to 65% boric acid, 0 to 25% aluminum fluoride and 20 to 60% lignosulfonate binder (50%).

10. The method of claim 9 wherein the suspension also contains up to 20% phenolic resin binder.

11. The method of claim 8 wherein the suspension is applied to the anode by brushing, rolling or spraying.

12. A method of treating a carbon cathode structures of an aluminum electrolysis cell, to improve the resistance of the cathode to deterioration during operation of the cell, which comprises preparing a liquid suspension of a refractory boride, a lignosulfonate binder and a phenolic resin binder and applying the liquid suspension as a protective coating to the cathode structures, followed by drying.

13. The method of claim 12 wherein the refractory boride is a boride of titanium, zirconium, vanadium, hafnium, niobium, tantalum, chromium or molybdenum.

14. The method of claim 12 wherein the refractory boride is titanium diboride.

15. The method of claim 14 wherein the suspension contains 55 to 65% titanium diboride, 0 to 5% anthracite, 15 to 20% lignosulfonate binder and 15 to 20% phenolic resin binder.

16. The method of claim 12 wherein the suspension is applied to the cathode structures by brushing, rolling or spraying.

17. A composition for coating a carbonaceous cell component of an electrolytic cell for the production of aluminum, to improve the resistance of said component to deterioration during operation of the cell which comprising a liquid suspension of a refractory material dispersed in a lignosulfonate binder solution.

18. The composition of claim 17 wherein the refractory compound is a boron, zirconium, vanadium, hafnium, niobium, tantalum, chromium or molybdenum compound.

19. The composition of claim 17 wherein the refractory material is boric acid, boron oxide or hydrated boron oxide.

20. The composition of claim 17 wherein the refractory material is titanium diboride.

21. The composition of claim 17 wherein the lignosulfonate binder comprises an ammonium or calcium salt.

22. A carbonaceous component for use in the electrolysis of aluminum, having a coating according to claim 17.

23. The carbonaceous component of claim 22 wherein said component is an anode.

24. The carbonaceous component of claim 23 wherein the coating is 0.5 to 2 mm thick.

25. The carbonaceous component of claim 22 wherein said component is a cathode.

26. The carbonaceous component of claim 25 wherein the coating is 0.5 to 15 mm thick.

27. The carbonaceous component of claim 25 wherein the coating is 1 to 3 mm thick.

28. A composition for coating a carbon anode used in aluminum electrolysis cells, to improve the resistance of the anode to deterioration during operation of the cell, which comprises a liquid suspension of a boron compound, aluminum fluoride and a lignosulfonate binder.

29. The composition of claim 28 wherein the suspension contains 25 to 60% boric acid, 0 to 25% aluminum fluoride and 20 to 60% lignosulfonate binder (50%).

30. The composition of claim 28 wherein the suspension also contains up to 20% phenolic resin binder.

31. A composition for coating carbon cathode structures of an aluminum electrolysis cell, to improve the resistance of the cathode to deterioration during operation of the cell, which comprises a liquid suspension of a refractory boride, a lignosulfonate binder and a phenolic resin.

32. The composition of claim 31 wherein the refractory boride is titanium diboride.

33. The composition of claim 31 wherein the suspension contains 20 to 70% titanium diboride, 5 to 40% lignosulfonate binder and 5 to 40% phenolic resin binder.

34. The composition of claim 31 further comprising 0 to 5% anthracite coal.

* * * * *